Patented Mar. 15, 1932

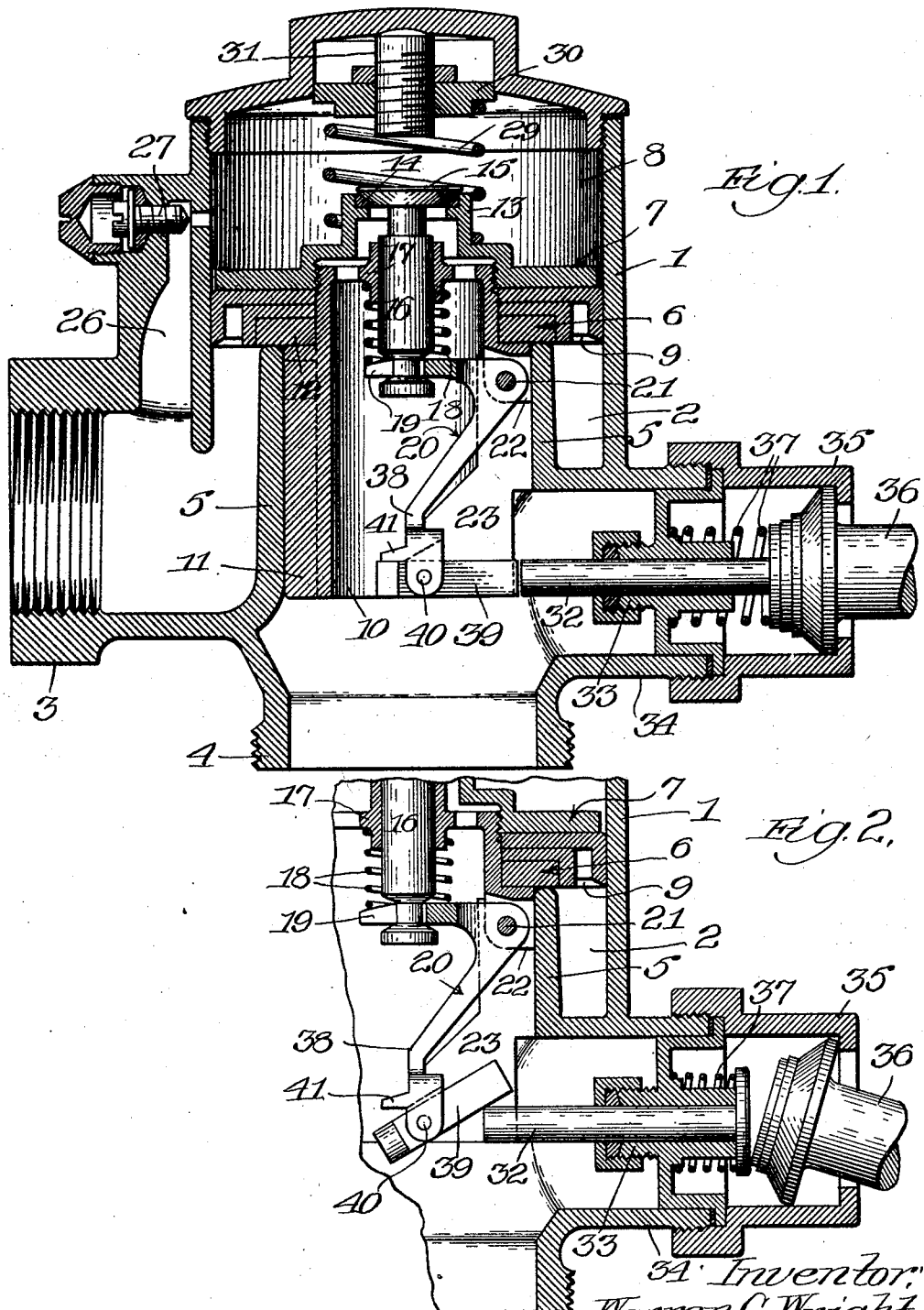

1,849,129

UNITED STATES PATENT OFFICE

WARREN C. WRIGHT, OF CHICAGO, ILLINOIS

FLUSH VALVE

Application filed September 6, 1928. Serial No. 304,203.

This invention relates to flush valves for toilet fixtures, such as bowls and the like.

In my copending application, Serial No. 284,132, I have shown, described, and claimed a flush valve of the piston operating type, with the auxiliary or relief valve for controlling the operation of the main valve. The relief valve is opened through the actuation of a lever by a plunger constituting part of the handle operating mechanism of the valve device. The plunger carries at its inner end within the valve housing a spring controlled depressible pin, which if held in valve opening position after starting the flushing operation of the valve will be in the path of downward movement of the lever with the main valve and depress the pin so as not to unseat the auxiliary valve in the closing movement of the main valve. While there are no objections to the use of this depressible pin or member on the plunger, the fact that a spring is employed makes it necessary to depend on a structure which might in time break or fail and also requires that special fittings be made to house and mount the pin and the spring, all contributing to the expense of the manufacture of the entire valve assembly.

The object of the present invention is to overcome the use of the pin and its spring, and I do this by providing a simple and inexpensive gravity acting member associated with the lower end of the lever and the adjacent end of the plunger, said member receiving the end thrust of the plunger to open the relief valve, but moving upward on contact with the plunger in the closing of the main valve to prevent unseating of the relief valve should the plunger be retained in valve opening position, as happens when the operating handle is not released after starting a flush.

In the accompanying drawings—

Fig. 1 is a vertical sectional view through a valve assembly containing the trigger of my invention; and Fig. 2 illustrates the action of the trigger.

The valve device of my invention comprises a main housing 1 of cast brass or other suitable material. The housing 1 is provided with a passage for the flow of liquids therethrough, and such passage includes a chamber 2 within the housing and inlet and outlet connections 3, 4 at opposite ends of the passage with the inlet connection 3 in constant communication with the chamber 2.

The chamber 2 is divided from the outlet connection 3 by an upright cylindric wall 5 having its lower end cast integral with the housing 1 and opening into the outlet connection 4. Said wall 5 extends upward through the chamber 2 and has its upper end forming a seat for the main valve 6 which controls the flow of fluids through the housing 1 from inlet 3 to outlet 4. The connections 3 and 4 may be threaded for attachment to the source of water supply and toilet fixture, respectively.

The main valve 6 forms part of a piston 7, which has a sliding fit in a cylindric chamber 8 provided in the housing 1 above the chamber 2 and forming an upward continuation thereof. The piston 7 has a sealing leather 9 which engages the inner wall of the chamber 8 to seal it from the chamber 2 in all positions of the piston.

The piston 7 has a centrally disposed tubular guide 10 which extends downward into the wall 5, said guide having radial webs 11 which engage the inner surface of the wall 5 to guide the piston in its up and down movements in the opening and closing of the main valve 6. A gasket 12 is suitably secured to the under side of the piston 7 about the guide 10 to seat against the upper end of the wall 5 when the main valve 6 is closed and cuts off the flow of liquids from 3 to 4. The spaces between the webs 11 and the guide 10 provide the discharge passages for the valve when the main valve 6 is open.

A tubular projection 13 extends upward from the piston 7 and is provided at its upper end with a gasket 14 which provides a seat for a relief or auxiliary valve 15. The valve 15 has a stem 16 which extends downward through the projection 13 and into the guide 10 through a bearing spider 17 at the upper end of the guide. The spider 17 holds the valve 15 central and guides it in the vertical opening and closing movements.

To close the auxiliary valve 15 and maintain it tight against its seat, a coiled spring 18 is provided about the stem 16 between the spider 17 and an arm 19, to the lower end of which the stem is connected. Said arm 19 is one of the arms of a bell-crank lever 20 fulcrumed at 21 between lugs 22 carried by the guide 10 at the upper end of a vertical slot 23 in the guide 10.

A by-pass 26 is cored in the housing 1 on the intake side of the valve and opens at its lower end into the inlet connection 3 and at its upper end into the chamber 8 above the piston 7. A timing pin 27 controls the flow of liquids into chamber 8 from the intake connection 3.

The upper surface of the piston 7 as exposed to the water pressure in chamber 8 is greater in area than the under surface of the piston which is exposed to the water pressure in the chamber 2 when the valve 6 is closed. The result is that, although the pressure on opposite sides of the piston will be the same as on the intake side of the valve, the valve 6 will be held closed against its seat by reason of the larger area exposed to the pressure in chamber 8.

A coiled spring 29 is located in the chamber 8 above the piston 7 and provides a pressure reducer for the valve device. The nut 30 on the stud 31 allows for adjustment of the tension of the spring to set the valve to discharge at the pressure desired.

For opening the auxiliary valve 15 to relieve the pressure in the chamber 8 so that the main valve 6 may be opened by the pressure on its under side, the following actuating mechanism is provided.

A plunger 32 is slidably mounted in a tubular guide 33 carried by a boss 34 cast integral with the housing 1 and extending outward therefrom, as shown. A union 35 is screwed on the outer end of the boss 34 and clamps the guide 33 thereto. An oscillating handle 36 is supported by the union 35, and a coiled spring 37 in the union 35 normally maintains the outer end of the plunger 32 against the inner end of the handle 36 so that the plunger will be moved inward by the handle in any direction that the handle may be oscillated.

The lower arm 38 of the lever 20 is shaped to have its lower end spaced inward from the inner end of the plunger 32, so that a gravity acting member 39 may lie between the plunger and the lever when the valves are closed. The gravity acting member may be in the form of a trigger 39, which is pivoted at 40 to the lower end of the arm 38 in a slot therein. The arrangement is such that the trigger 39, when the valves are closed, stands at right-angles to the lever in horizontal alignment with the plunger. The lever arm 38 has a stop lug 41 above the trigger and on the side opposite the plunger to prevent the trigger from swinging out of horizontal alignment with the plunger when the valves are closed and the plunger released.

The pivot 40 is nearer the end of the trigger on the side remote from the plunger so that the trigger will have its longest position nearest the plunger and thus drop by its own weight against the stop 41. This avoids the use of springs which are likely to fail by breakage when the valve is in use.

To open the relief valve 15 to start the flushing operation, the plnger 32 is moved inward by oscillating the handle 36. This thrusts the inner end of the plunger 32 against the trigger 39 and swings the lower arm of the lever 20 inward. The result is that the upper arm 19 of the lever is swung upward, and the relief valve 15 is unseated. This relieves the pressure in the chamber 8 and the piston 7 moves upward carrying the lever 20 therewith. This carries the trigger 39 above and out of contact with the plunger 32, and the relief valve 15 closes by the action of the spring 18. The trigger is so proportioned that it remains in abutting contact with the plunger 32 for substantially the full opening movement of the main valve 6, thereby insuring a full opening of said valve because the trigger does not release from the plunger to allow the relief valve to close until the main valve has reached the upper limit of its opening movement. Pressure builds up in the chamber 8 through the by-pass 26 as soon as the relief valve closes and the main valve 6 closes cutting off the flow from 3 to 4.

Should the handle 36 be held in valve opening position during the descent of the main valve 6, the plunger 32 will be in the path of downward movement of the trigger 39. The latter, however, on contact with the plunger will swing upward about its pivot 40 and prevent the unseating of the relief valve 15, as shown in Fig. 2. When the handle 36 is released, the plunger 32 will be retracted by spring 37, freeing the trigger 39 and allowing it to drop by gravity into its horizontal position in line with the plunger for again opening the relief valve when another flush is desired.

The trigger 39 provides a simple and inexpensive form of release between the lever 20 and the plunger 32 and, working at all times by gravity, avoids the use and expense of spring or like means to return the trigger to its normal position or to retain it in that position when out of contact with the plunger.

The details of structure shown and described may be variously changed and modified without departing from the spirit and scope of my invention.

I claim as my invention:

1. In a flush valve, a main valve, an auxiliary valve carried thereby, a pivoted lever carried by the main valve, a plunger for swinging the lever to open the auxiliary valve, said lever having its lower end off-set inwardly from the plunger, and a gravity acting member carried by the lower off-set end of the lever, said member being normally in axial alinement with the plunger when both valves are closed to receive the thrust of the plunger when opening the auxiliary valve, but permitting the main valve to close without unseating the auxiliary valve should the plunger be retained in the path of the member.

2. In a flush valve, a main valve, an auxiliary valve carried thereby, a pivoted lever carried by the main valve, a plunger for swinging the lever to open the auxiliary valve, said lever having its lower end off-set inwardly from the plunger, a gravity acting trigger pivotally carried at the off-set lower end of the lever to receive the thrust of the plunger when opening the auxiliary valve, and a stop to prevent the trigger from swinging out of position for engagement by the plunger when released therefrom.

3. In a flush valve, a main valve, an auxiliary valve carried thereby, a pivoted lever carried by the main valve, a plunger for swinging the lever to open the auxiliary valve, and a trigger pivoted to the lever and extending toward the plunger in axial alignment therewith to receive the thrust thereof when opening the auxiliary valve, said trigger remaining in abutting contact with the plunger for susbtantially the entire opening movement of the main valve.

4. In a flush valve, a main valve, an auxiliary valve carried thereby, a pivoted bell-crank lever carried by the main valve and having one arm engaged with the auxiliary valve, and the other arm off-set inwardly a spring for closing the auxiliary valve and holding the lever in its normal position, a gravity acting member carried by the offset arm of the lever, and a plunger movable against said member to swing the lever to open the auxiliary valve, said member moving with respect to said lever on contact with the plunger in the closing of the main valve should the plunger be held in the path of the member.

5. In a flush valve, a main valve, an auxiliary valve carried thereby, a bell-crank lever carried by said main valve and having one end engaged with the auxiliary valve, a spring for closing the auxiliary valve and holding the lever to its normal position, and a trigger pivoted to the other arm of the lever to receive the thrust of the plunger when opening the auxiliary valve, the last mentioned arm being shaped to have its portion adjacent the plunger offset inwardly therefrom so that the trigger when free will be in direct axial alignment with the plunger.

6. In a flush valve, a housing having an inlet and a discharge, a main valve controlling the flow of liquids from the inlet to the discharge, a cylinder dividing the inlet from the discharge and forming a seat for the main valve, an auxiliary valve carried by the main valve, a tubular guide carried by the main valve and having a sliding fit in said cylinder, said guide having a slot in one side thereof, a lever pivoted on the main valve to open the auxiliary valve and movable in said slot, actuating means for swinging the lever to open the auxiliary valve, said lever having its end at said actuating means offset inwardly therefrom and gravity acting means carried by the offset end of said lever to receive the thrust of the actuating means and permitting the main valve to close without unseating the auxiliary valve regardless of the position of the actuating means.

In testimony whereof I affix my signature.
WARREN C. WRIGHT.